(12) United States Patent
Queener

(10) Patent No.: US 7,175,226 B1
(45) Date of Patent: Feb. 13, 2007

(54) SPLIT GLASS WINDOW ASSEMBLY FOR AUTOMOBILES

(75) Inventor: Lawrence Queener, Pinckney, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 15 days.

(21) Appl. No.: 11/230,680

(22) Filed: Sep. 20, 2005

(51) Int. Cl.
*B60J 1/00* (2006.01)
*B60J 1/14* (2006.01)
*B60J 1/17* (2006.01)

(52) U.S. Cl. ............ 296/146.16; 49/125; 49/127; 49/128; 49/129; 49/349; 49/374

(58) Field of Classification Search ......... 296/146.16, 296/106; 49/125, 127, 128, 129, 349, 374
See application file for complete search history.

(56) References Cited

U.S. PATENT DOCUMENTS 3,568,366 A * 3/1971 Carella .................. 49/349

6,840,009 B2 * 1/2005 Ronay et al. ............ 49/127

FOREIGN PATENT DOCUMENTS

DE          102004011     * 9/2005

* cited by examiner

*Primary Examiner*—Dennis H. Pedder
(74) *Attorney, Agent, or Firm*—Gigette M. Bejin; Miller Law Group PLLC

(57) ABSTRACT

A split glass rear side window assembly is separable along a generally horizontal longitudinally extending line into an upper glass member and a lower glass member separated by a seal carried by the lower glass member to receive the upper glass member when raised to cover the corresponding body opening. The upper and lower glass members are connected by side links that are pivotally connected to the lower glass member and slidable along the ends of the upper glass member to permit the upper and lower glass members to be stored in a parallel orientation spaced transversely within the limited storage area above the rear wheel well in the vehicle body. A spring device urges the lower glass member into a pre-selected storage pocket spaced transversely of the path of movement of the upper glass member. A rack and pinion apparatus vertically moves the window members.

20 Claims, 10 Drawing Sheets

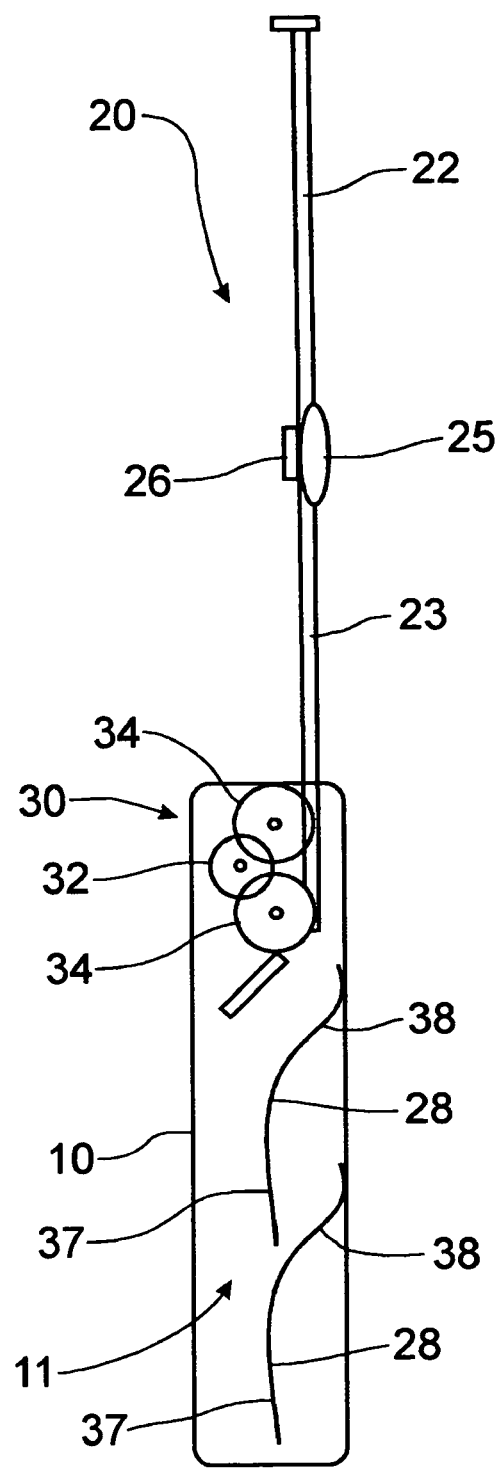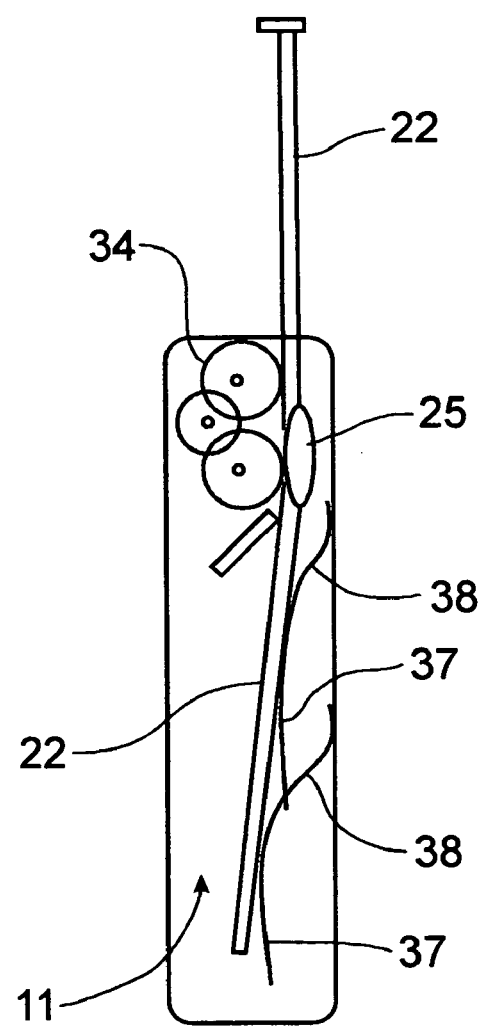
Fig. 4
Fig. 5

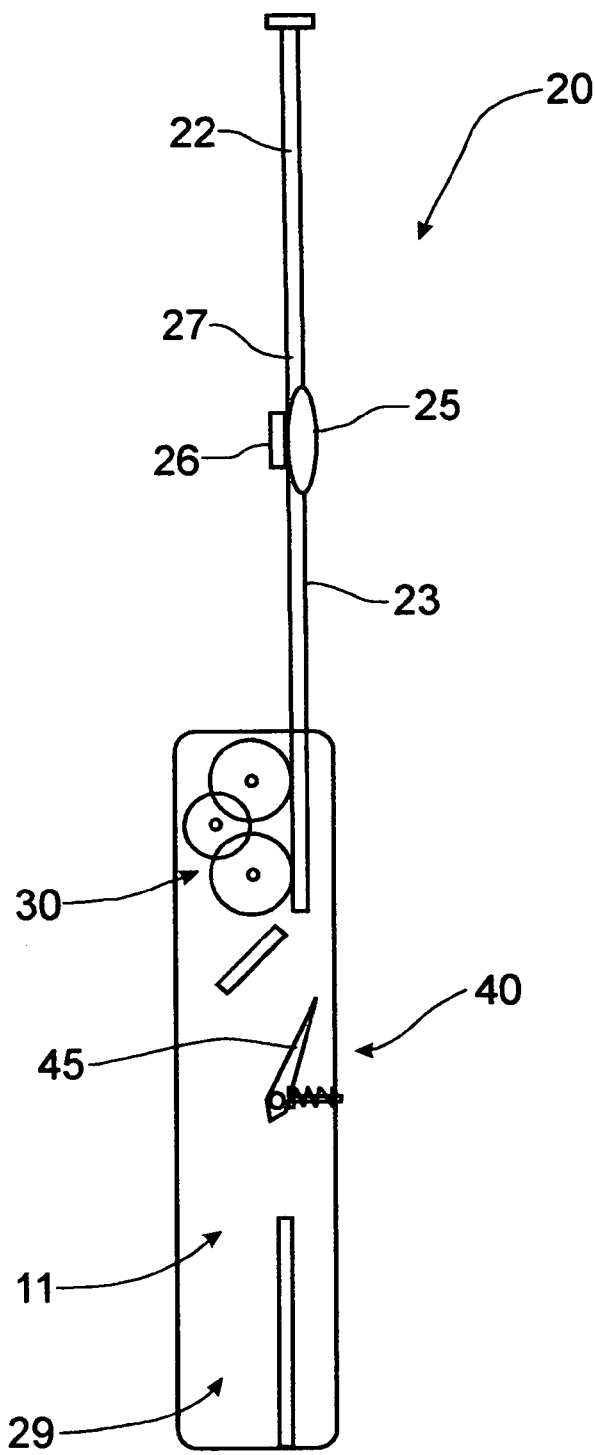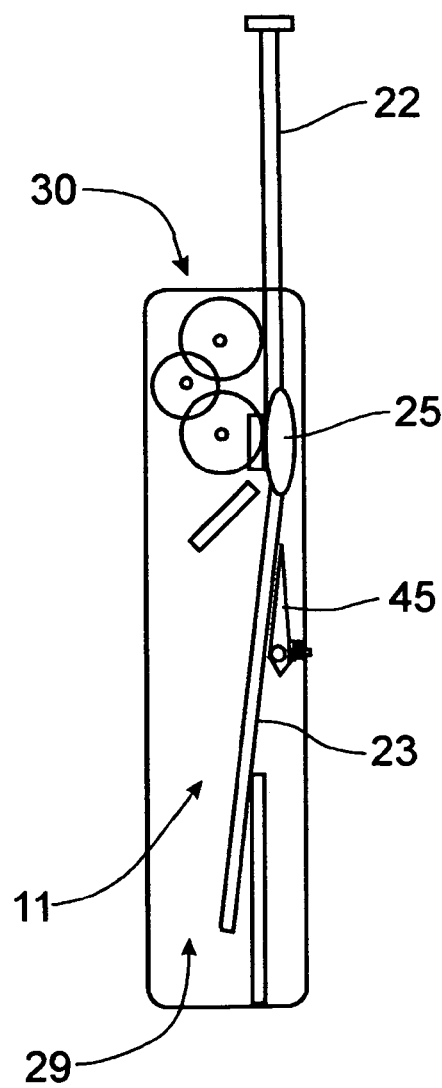
Fig. 15                    Fig. 16

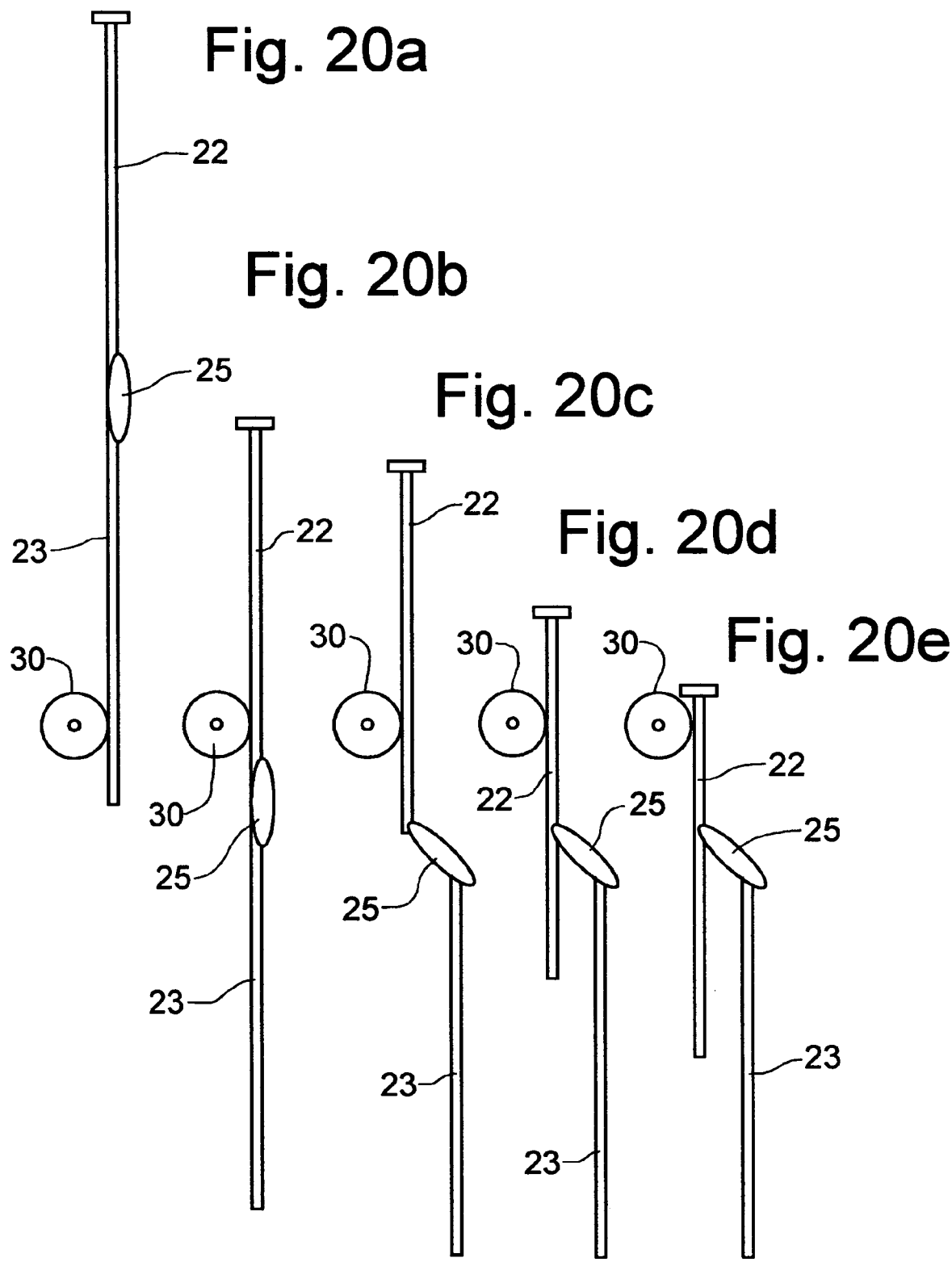

SPLIT GLASS WINDOW ASSEMBLY FOR AUTOMOBILES

FIELD OF THE INVENTION

This invention relates to side windows for automobiles and, more particularly, to a split glass assembly to permit window movement in locations having limited storage space.

BACKGROUND OF THE INVENTION

Vehicles having a roofed enclosure defining a passenger compartment extending from the front dash rearwardly to the rear of the vehicle, such as a sport utility vehicle, typically provide glass-covered openings for visibility from within the passenger compartment. Such vehicles have rear axles supporting rotatable tires permitting mobility for the vehicle. The vehicle body is configured with a rear wheel well that lies between the passenger seat and the outer skin of the vehicle. The space required for the rear wheel well limits the storage space available for any side windows to be retractable into the vehicle body. As a result, the rear side glass of such vehicles is typically stationary. In some vehicles, such as a mini-van, the side window glass above the rear wheel well can be slidable in a fore-and aft direction or pivoted to permit the rear of the side window to pop out, thus allowing some opening of the side window positioned over the rear wheel well.

The location of the rear axle and the accommodating wheel wells leaves a limited amount of storage space above the structure of the wheel well and the belt line of the vehicle. The limited storage space is significantly smaller than the size of the window opening above the vehicle belt line. As a result, the conventional rear side windows of such vehicles cannot be retracted into the limited storage area to completely open the side window opening. Although a partial retraction of the side window glass into this limited storage area can be accomplished, partial retraction of the window is undesirable in that part of the window opening remains closed and the partially retracted glass is only partially supported. Accordingly, it would be desirable to provide a window assembly that would be capable of full retraction to allow the entire rear side window opening to be unobstructed.

By providing structural components that can be moved to re-position the rearward wall of the passenger compartment, a sport utility vehicle that can be converted from a sport utility vehicle configuration, in which the passenger compartment extends fully to the rear of the vehicle, to a pick-up truck configuration, in which the passenger compartment extends only partially rearwardly allowing the rearward area of the chassis to define an open cargo bed. The fore-and-aft movement of the structural components defining the rearward wall of the passenger compartment requires that any side window glass be positioned in a manner that permits the structural components to be moved. Retracting the rear side window glass into the limited storage area above the rear wheel well permits the upper rear wall of the vehicle to be moved forwardly to open the rear portion of the chassis to the atmosphere. Thus, it would be desirable for such a convertible sport utility vehicle to have fully retractable rear side window glass to permit the conversion of the vehicle between a sport utility mode and a pick-up truck mode.

Accordingly, it would be desirable to provide a rear side window assembly that would be retractable into a limited package storage space smaller than the corresponding opening in the vehicle body.

SUMMARY OF THE INVENTION

It is an object of this invention to overcome the aforementioned disadvantages of the known prior art by providing a split glass rear side window assembly that can be retracted into a storage space that is smaller than the opening in the vehicle body corresponding to the rear side window.

It is a feature of this invention that the rear side window is retractable into a storage space that lies above the rear wheel well and the vehicle belt line.

It is another feature of this invention that the rear side window glass separates along a longitudinally extending line to divide into an upper glass and a lower glass.

It is an advantage of this invention that the upper and lower glass members can be stored in a limited size storage space in a stacked array.

It is another advantage of this invention that the side window glass of a sport utility vehicle can be fully retracted into the vehicle body.

It is another feature of this invention that the rear side window assembly incorporates a spring apparatus that urges the lower glass member into a first storage pocket transversely offset from the path of movement of the upper glass member.

It is yet another feature of this invention that a connecting link interconnects the upper portion of the lower glass member with the sides of the upper glass member.

It is still another advantage of this invention that a power rack and pinion apparatus can be utilized to affect movement of the split glass rear side window assembly between raised and lowered positions.

It is still another feature of this invention that the split glass rear side window assembly includes a spacer to keep the upper and lower glass members separated in transversely spaced storage areas when retracted into the vehicle body.

It is yet another advantage of this invention that the spacer separating the upper and lower glass members when in the storage position reduces rattles and vibrations in the glass members.

It is still another object of this invention to provide a rear side window glass assembly that can be separated into upper and lower glass members that can be stored in parallel orientations spaced transversely within the limited storage area between the rear wheel well and the vehicle belt line.

It is a further feature of this invention that the rear side window glass can be separated into multiple pieces that can be stored in parallel orientations within the vehicle body.

It is a further object of this invention to provide a split glass rear side window assembly that can be retracted into a storage area that is smaller than the area covered by the glass and that is durable in construction, inexpensive of manufacture, carefree of maintenance, facile in assemblage, and simple and effective in use.

These and other objects, features and advantages are accomplished according to the instant invention by providing a split glass rear side window assembly that is separable along a generally horizontal longitudinally extending line into an upper glass member and a lower glass member separated by a seal carried by the lower glass member to receive the upper glass member when raised to cover the corresponding body opening. The upper and lower glass members are connected by side links that are pivotally connected to the lower glass member and slidable along the ends of the upper glass member to permit the upper and lower glass members to be stored in a parallel orientation spaced transversely within the limited storage area above the rear wheel well in the vehicle body. A spring device urges the lower glass member into a pre-selected storage pocket spaced transversely of the path of movement of the upper glass member. A rack and pinion apparatus vertically moves the window members.

BRIEF DESCRIPTION OF THE DRAWINGS

The advantages of this invention will become apparent upon consideration of the following detailed disclosure of the invention, especially when taken in conjunction with the accompanying drawings wherein:

FIG. 4 is a schematic cross-sectional view of the rear side window assembly and corresponding storage area with the split glass window being fully raised into the operative postion;

FIG. 5 is a schematic cross-sectional view similar to that of FIG. 4 but with the window partially retracted into the storage area to a point where the upper and lower glass members begin to separate;

FIG. 15 is a schematic cross-sectional view similar to that of FIG. 4 but with an alternative spring-loaded flipper member to position and separate the upper and lower glass members, the window being in a fully raised position;

FIG. 16 is a schematic cross-sectional view similar to that of FIG. 15 but with the window partially retracted into the storage area to a point where the upper and lower glass members begin to separate;

FIGS. 20a–20e are schematic representations of the movement of the split glass rear side window from a fully raised position to a fully retracted position, the movement of the connecting link along the end of the upper glass member being emphasized.

DETAILED DESCRIPTION OF THE PREFERRED EMBODIMENT

Figure 1:
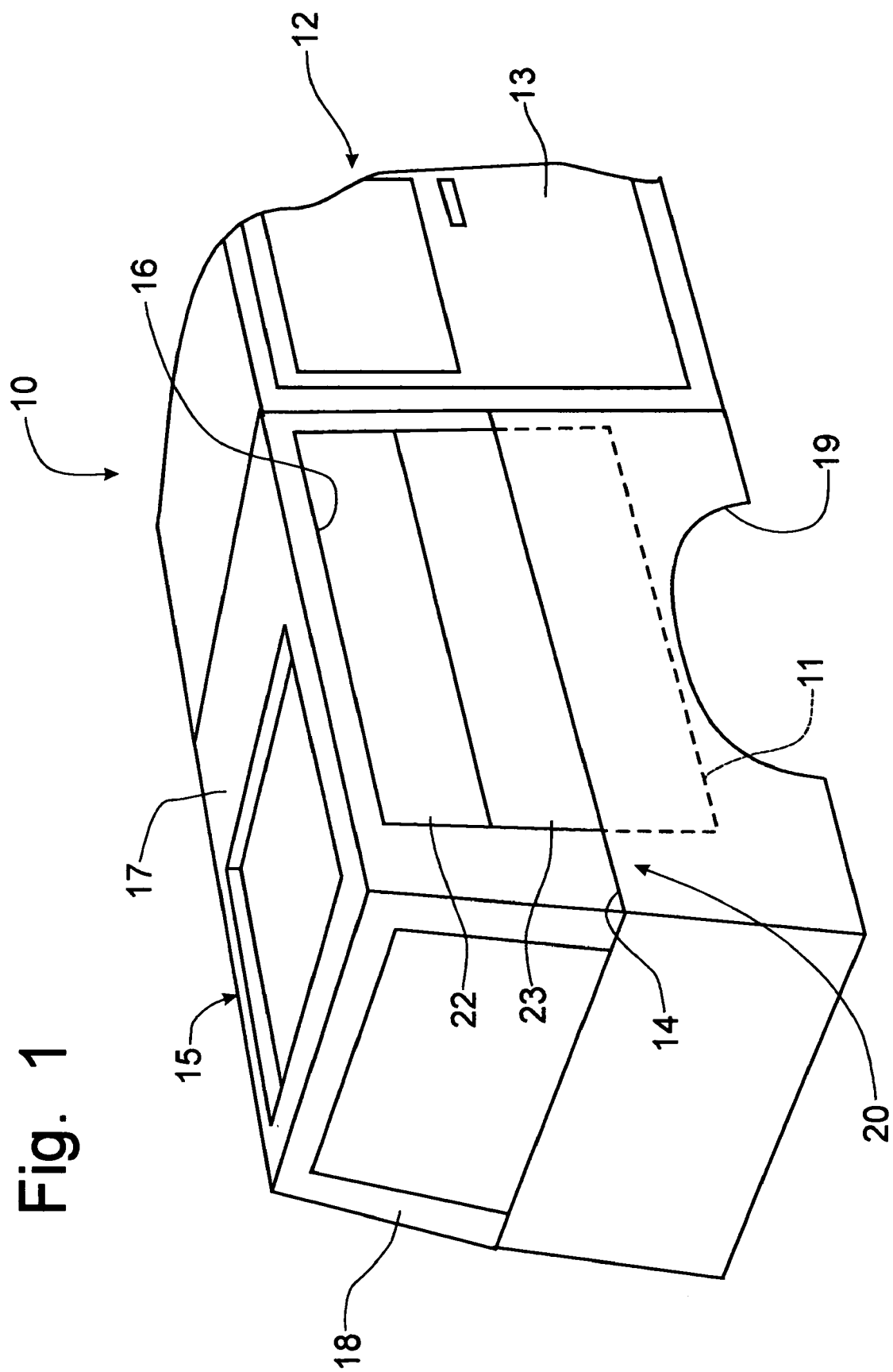
FIG. 1 is a schematic partial right, rear perspective view of a vehicle body having a rear side window incorporating the principles of the instant invention, the limited storage area in which the split glass window is to be retracted being shown in dashed lines.

Referring to the drawings, a vehicular body structure having a rear side window incorporating the principles of the instant invention can best be seen. The vehicle body 10 has a forward passenger compartment 12 accessible through conventional doors 13, and a rear compartment 15 that can be accessed through a tailgate 16. The body 10 is provided with rear wheel wells 19 within which a conventional rear axle with tires (not shown) are operable. In one configuration of the vehicle body 10, the roof structure 17 over the rear compartment remains fixed and the rear compartment is further accessible through the doors 13 to form a rear passenger compartment. In an alternative configuration, the rear wall 18 of the rear roof structure 17 is movable along tracks with telescopic supports (not shown) that allow the rear wall 18 to move forwardly to close off the front passenger compartment 12 and open the rear compartment 15 into an open cargo bed.

In the first mentioned configuration with the roof structure 17 fixed, as in a conventional sport utility vehicle, it would be desirable to provide a window assembly 20 that would be capable of completely retracting into the vehicle body 10 so that the corresponding window opening 16 in the body 10 would be fully opened. In the alternative embodiment with the forwardly movable rear wall 18 that converts the vehicle body 10 between a sport utility configuration and a pick-up truck configuration, the rear wall 18 cannot move forwardly as long as the window assembly 20 is in a raised position. The window assembly 20 must be able to completely retract into the vehicle body 10 so that the window assembly 20 does not impede the movement of the rear wall 18. One skilled in the art will recognize that the application of a window assembly 20 is not limited to sport utility vehicles, but would also be applicable to a variety of vehicles that traditionally use fixed glass, such as vans, minivans and station wagons.

Figure 3:
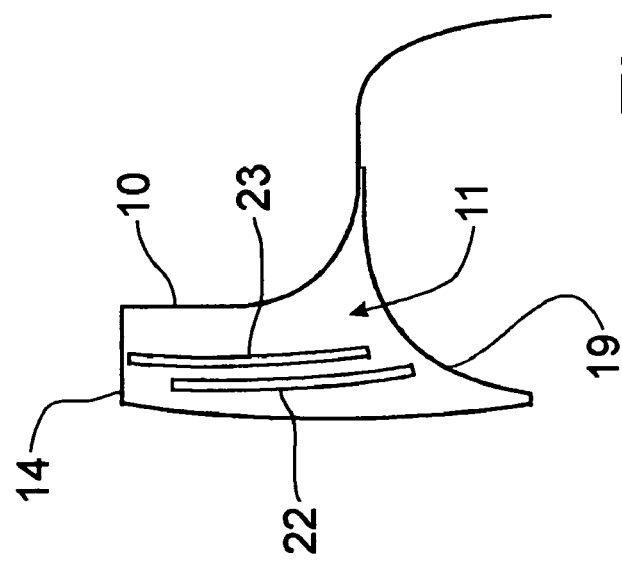
FIG. 3 is a schematic partial cross-sectional view similar to that of FIG. 2, but showing the split glass rear side window being moved into the retracted position within the limited storage area above the rear wheel well.
Figure 2:
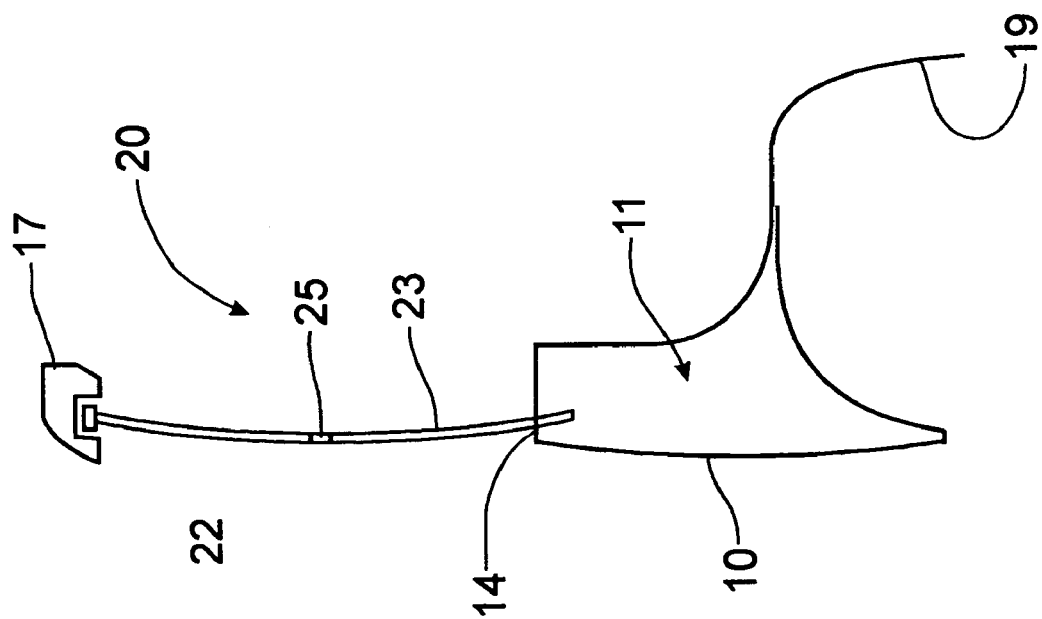
FIG. 2 is a schematic partial cross-sectional view through a portion of the vehicle body at the rear side window, the split glass window being raised to an operative position.
Figure 8:
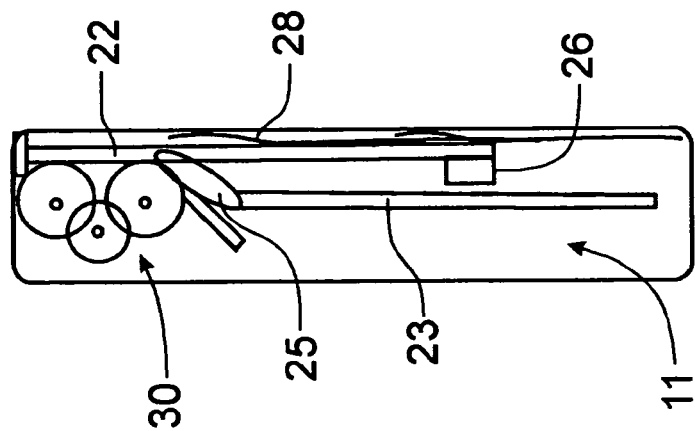
FIG. 8 is a schematic cross-sectional view similar to that of FIG. 7 but with the window fully retracted into the storage area with the upper and lower glass members stored in generally parallel orientations.

As is depicted in FIGS. 1–3, the storage capacity of the vehicle body 10 within the storage area 11 between the rear wheel well 19 and the belt line 14 in terms of vertical height is smaller than the overall vertical height of the window assembly 20. To facilitate the retraction of the window assembly 20 into the vehicle body 10 into the storage area 11 between the wheel well 19 and the belt line 14, the window assembly 20 is formed in a split glass configuration with a upper glass member 22 supported above a lower glass member 23 and a seal 24 therebetween. By separating the upper and lower glass members 22, 23 and storing the glass members 22, 23 in a generally parallel configuration, as is represented in FIG. 3, the entire glass portion 22, 23 of the window assembly 20 can be retracted into the storage area 11.

As is best seen in FIGS. 4–8, the upper and lower glass members 22, 23 are interconnected by connecting links 25 located at the opposing fore-and-aft ends of the glass members 22, 23. The connecting links 25 are pivotally connected to the top of the lower glass member 23 and slidable along a channel 27 on the respective ends of the upper glass member 22. The function of the connecting links 25 is to keep the two glass members 22, 23 connected together while allowing the two glass members 22, 23 to separate and be stored in a generally parallel orientation, as will be described in greater detail below. Within the storage area 11, spring members 28 are mounted to engage the lower glass member 23 as the lower glass member 23 retracts into the storage area 11 to urge the lower glass member into a pre-selected storage pocket 29. Furthermore, a guide member 26 is positioned to serve as a cam for the positioning of the connecting link 25 when the lower glass member 23 is positioned in the storage pocket 29.

Figure 9:
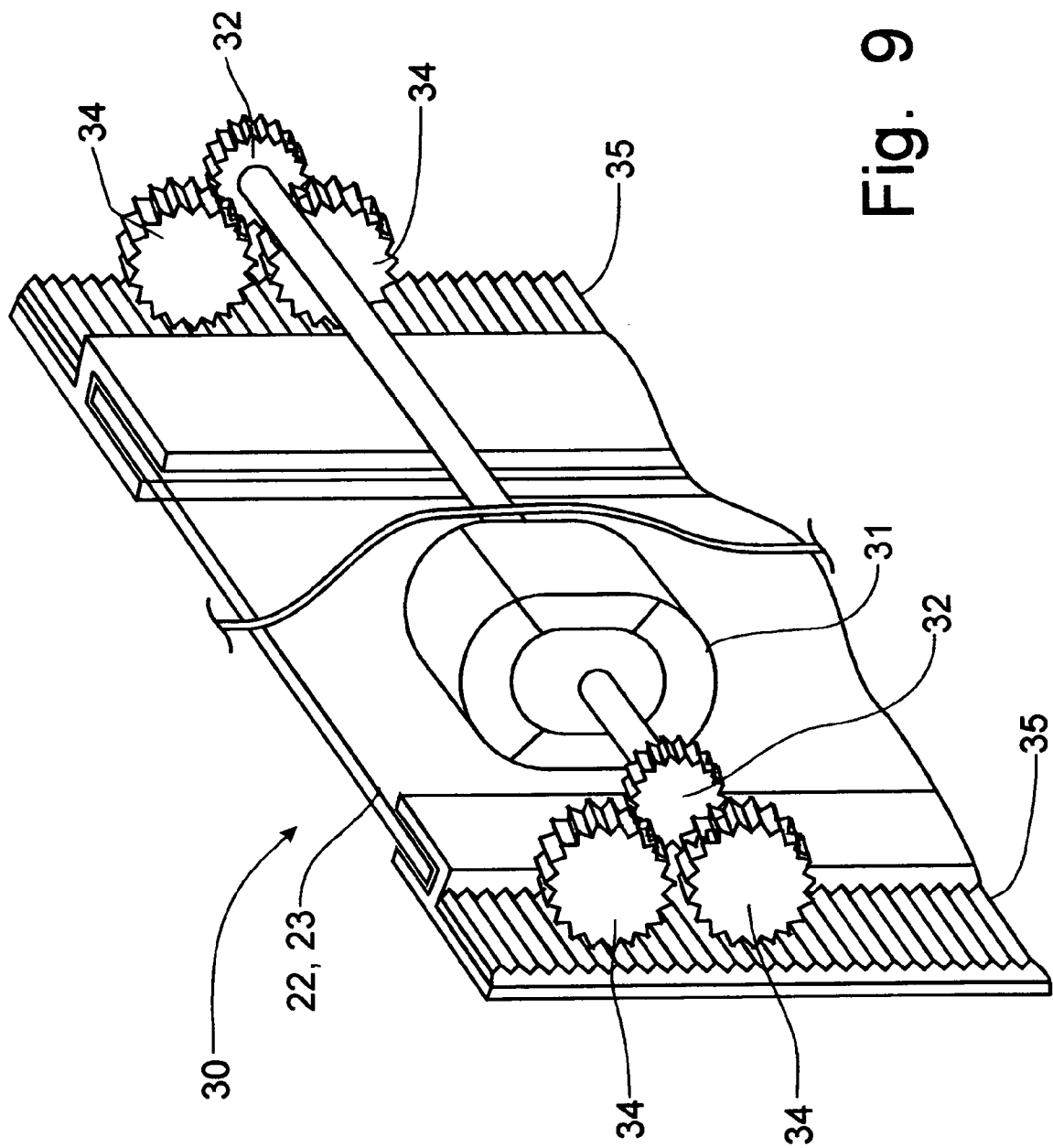
FIG. 9 is a perspective view of the rack and pinion drive mechanism powering the vertical movement of the split glass window assembly, a central portion of the window assembly being removed for purposes of clarity.

The movement of the upper and lower glass members 22, 23 is powered by opposing electrically driven pinions 34 engaged with a rack 35 mounted on each fore-and-aft end of the glass members 22, 23. The rack and pinion drive mechanism 30 can best be seen in FIG. 9. The electric motor 31 rotates a drive cog 32 which, in turn, drives the rotation of a pair of vertically spaced pinions 34 on each lateral end of the glass members 22, 23. A pair of pinions 34 at each end of the glass members 22, 23 is preferable to ensure a positive driving engagement between the pinions 34 and the rack 35 affixed to the glass members 22, 23, particularly as the upper and lower glass members 22, 23 separate within the storage area 11. One skilled in the art will readily recognize that the racks 35 and the associated mounting structure is located within the body 10 of the vehicle, such as behind the roof structure 17 and/or the rear wall 18, so as not to be exposed.

Figure 11:
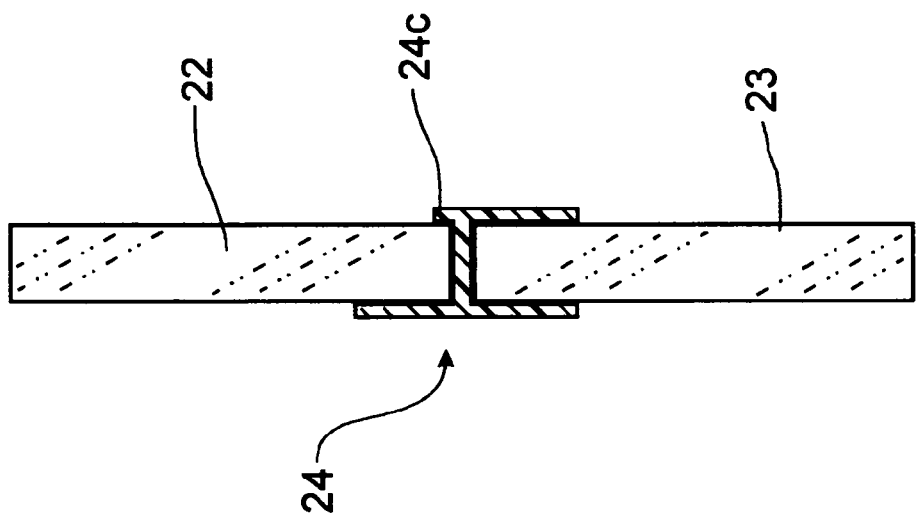
FIG. 11 is a partial cross-sectional view similar to that of FIG. 10, but showing an alternative seal arrangement.
Figure 10:
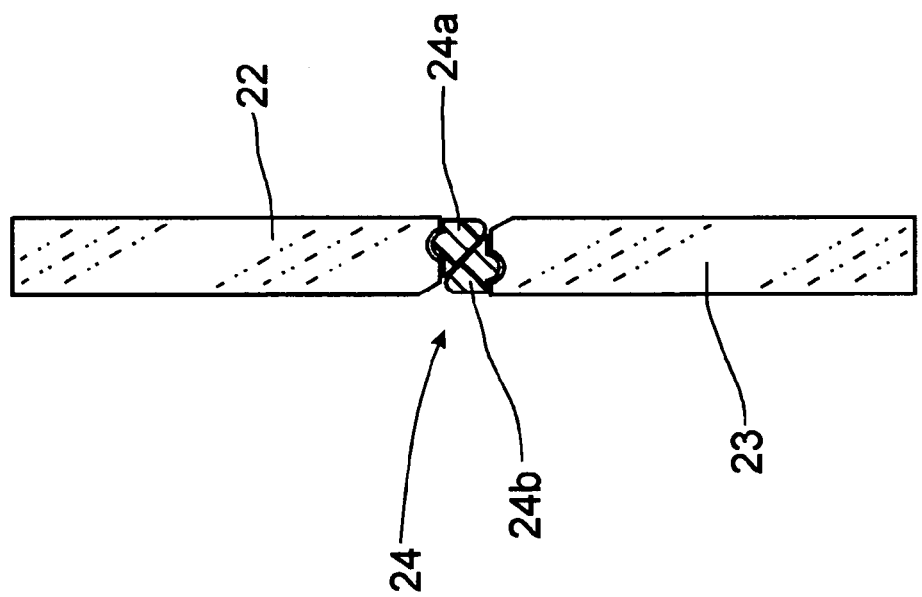
FIG. 10 is a partial cross-sectional view through the seal between the upper and lower glass members of the split glass window assembly.

The seal 24 between the upper and lower glass members 22, 23 can be formed in mating convoluted shapes, as is best seen in FIG. 10, with one seal 24a affixed to the bottom of the upper glass member 22 and a second mating seal 24b affixed to the top of the lower glass member 23 so that the two seals 24a, 24b can easily separate when being retracted into the storage area 11, yet provide a sturdy, functionally effective seal between the upper and lower glass members 22, 23 when the glass members 22, 23 are fully, or even partially, raised out of the storage area 11. Alternatively, the seal 24 can be formed in an "H" configuration, as is best seen in FIG. 11, with the upper interior leg 24c being shorter than the other legs of the H-type seal 24. The upper interior leg 24c is shorter to facilitate the movement of the upper glass member 22 out of engagement with the H-type of seal 24, as will be described in greater detail below, when in the storage area 11, and back into a sealing engagement with the H-type seal when being raised out of the storage area 11.

A spacer member 26 is mounted on the opposing ends of the upper glass member 22 to maintain a minimum spacing between the upper and lower glass members 22, 23 as the lower glass member 23 separates from the upper glass member 22 and moves into the pre-selected storage pocket 29. The spring members 28, as are shown in FIGS. 4–8, are preferably formed with a leaf member 37 that projects from a biasing spring 38 located off to the side of the window assembly 30 so that the biasing spring 38 urges the leaf member 37 into engagement with the lower glass member 23, while allowing the upper glass member 22 to pass by without interference. In the alternative, as can be best seen in FIGS. 12–17, the biasing device can be formed as a pair of flipper assemblies 40 that project into engagement with the lower glass member 23 to both urge the lower glass member 23 into a lateral storage pocket and to isolate the upper glass member 22 from the lower glass member 23 when retracted into the storage area 11.

Figure 12:
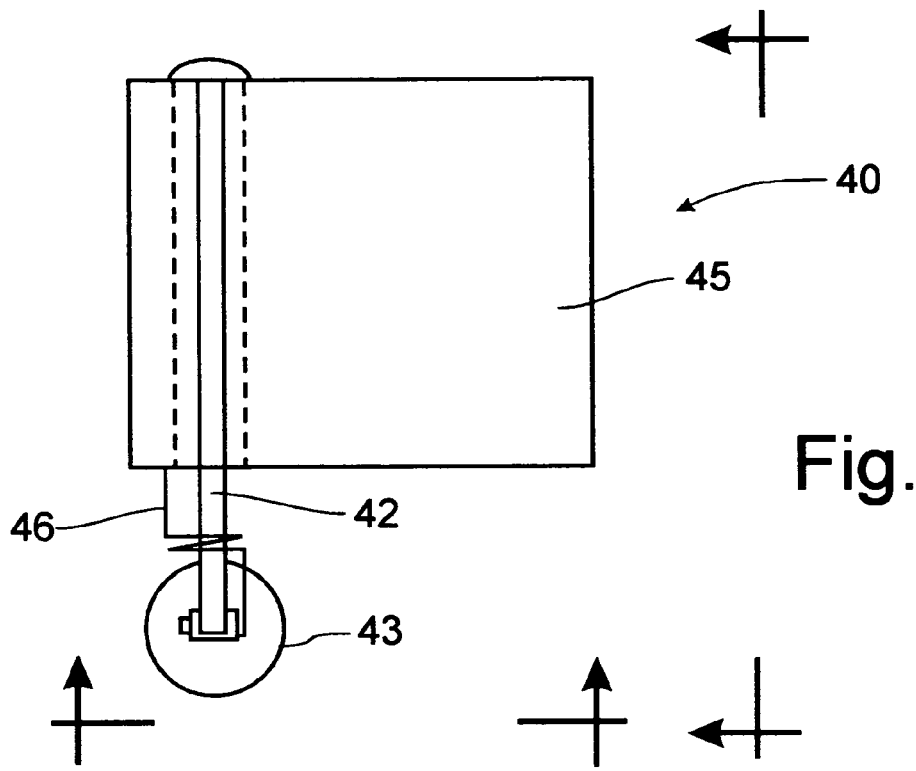
FIG. 12 is an elevational view of the alternative spring-loaded flipper member utilized to separate the upper and lower glass members when being retracted into the vehicle body.
Figure 13:
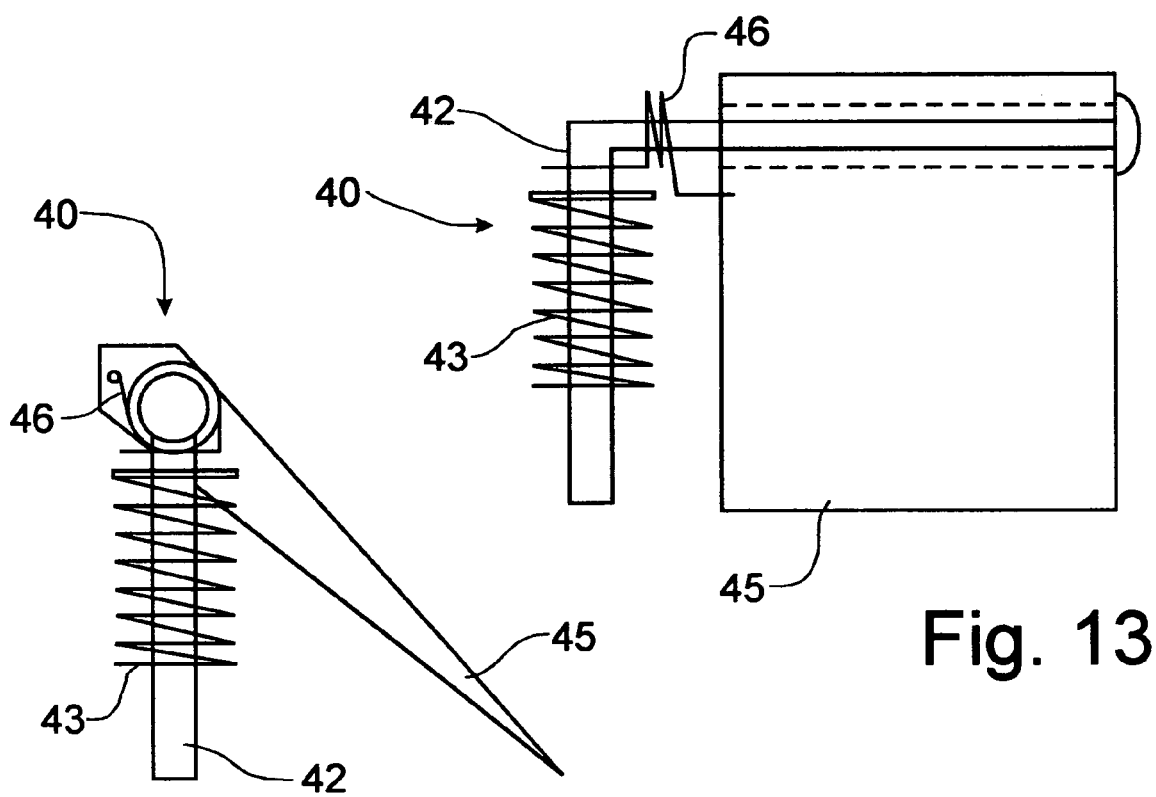
FIG. 13 is an orthogonal view of the spring-loaded flipper member corresponding to lines 13—13 of FIG. 12.
Figure 14:
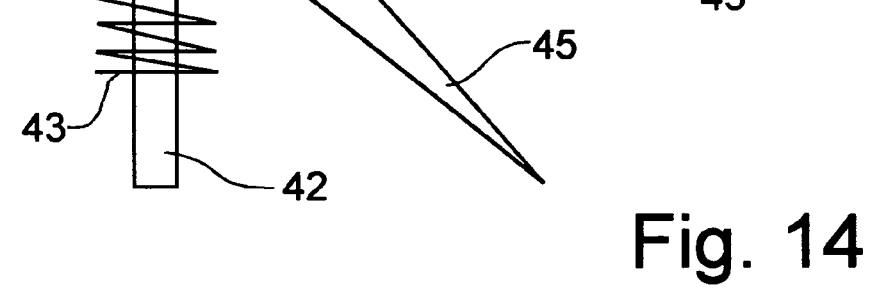
FIG. 14 is an elevational view of the spring-loaded flipper member corresponding to lines 14—14 of FIG. 12.
Figure 19:
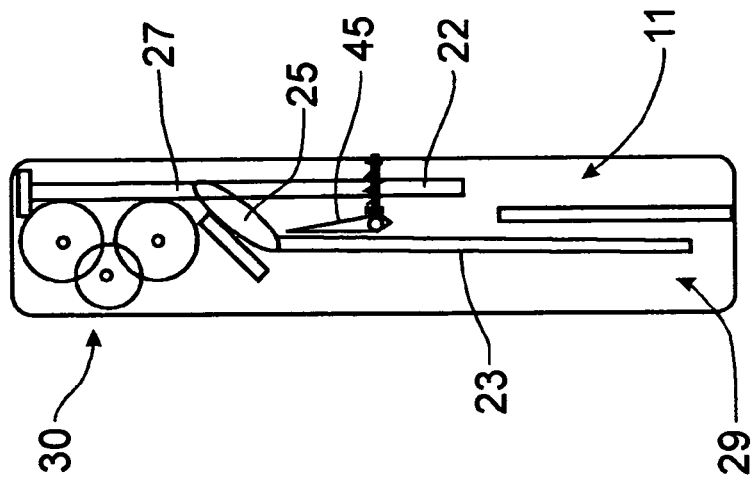
FIG. 19 is a schematic cross-sectional view similar to that of FIG. 18 but with the window fully retracted into the storage area.
Figure 18:
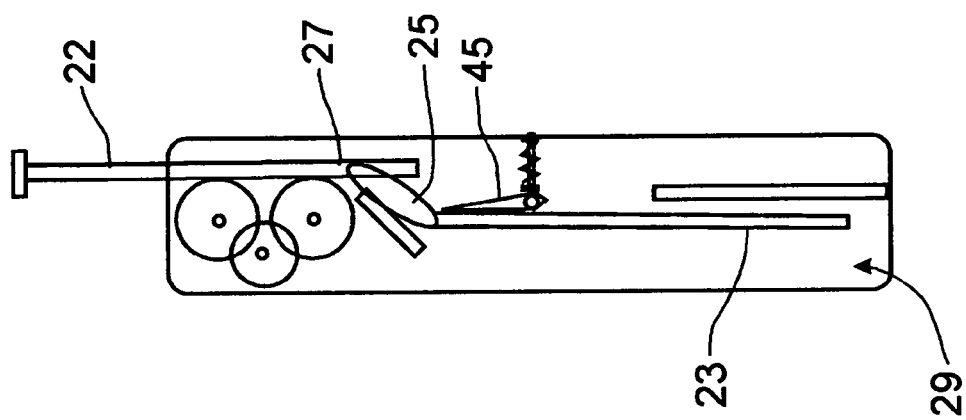
FIG. 18 is a schematic cross-sectional view similar to that of FIG. 17 but with the window further retracted into the storage area to a point where the connecting link begins to slide along the end of the upper glass member.

The details of the flipper assemblies 40 can be seen in FIGS. 12–14. A support shaft 42 is mounted in the storage area 11 to pivotally support the flipper member 45 for movement with the lower glass member 23, as is depicted in FIGS. 16–19. A first spring 43 is mounted on the support shaft 42 to bias the flipper member 45 away from the interior wall of the storage area 11, which serves to push the lower glass member 23 away from the upper glass member 22 when the lower glass member 23 disengages the driven pinions 34. A second spring 46 biases the pivotal movement of the flipper member 45 on the support shaft 42 into a position to ensure engagement with the lower glass member 23 as the lower glass member 23 descends into the storage cavity 11.

In operation, as is best seen in FIGS. 4–8, with respect to the leaf spring members 38, in FIGS. 15–19, with respect to the spring-loaded flipper members, and generally in FIGS. 20a–20e, the drive mechanism 30, through the engagement of the rotating driven pinions 34 and the rack 35, pulls the lower glass member 23 downwardly into the storage cavity 11, with the lower glass member 23 pulling the upper glass member 22 toward engagement with the drive mechanism 30. Prior to the connecting link 25 coming into engagement with the driven pinions 34, the bottom portion of the lower glass member 23 reaches the spring members 28, whether in the form of a leaf spring combination 37, 38, or the spring-loaded flipper member 45, and forces the lower glass member 23 out of alignment with the upper glass member 23. In the depiction of the invention shown in FIGS. 4–8 and 15–19, the lower glass member is deflected to the left of the respective drawings as the driven pinions 34 continue to cause the lower and upper glass members 23, 22 to descend into the storage area 11.

Figure 7:
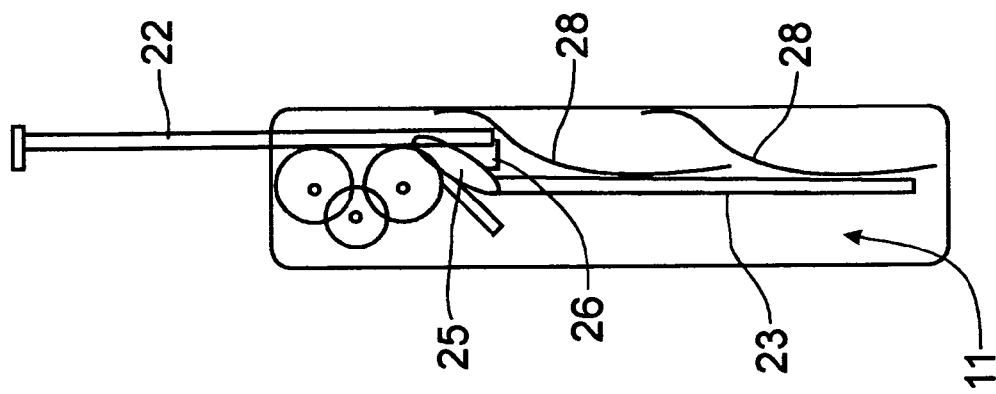
FIG. 7 is a schematic cross-sectional view similar to that of FIG. 6 but with the window further retracted into the storage area, the connecting link sliding along the end of the upper glass member as the upper glass member retracts into the storage area beside the lower glass member.
Figure 6:
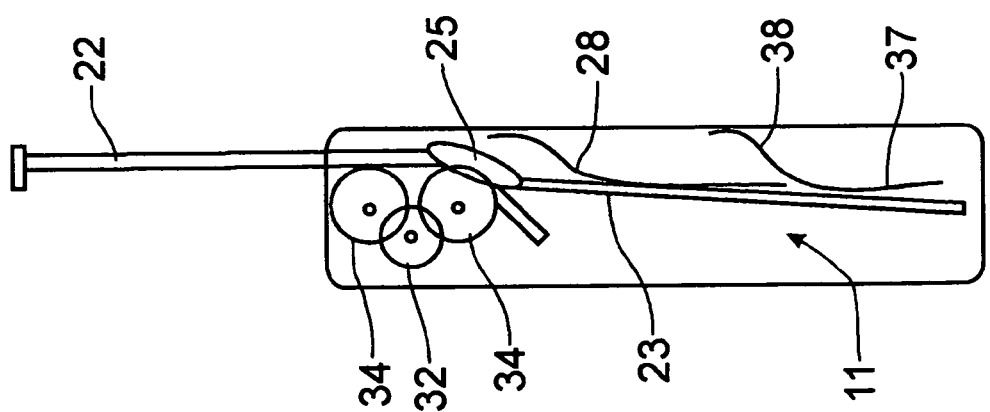
FIG. 6 is a schematic cross-sectional view similar to that of FIG. 5 but with the window further retracted into the storage area to a point where the spring devices urge the lower glass member laterally relative to the upper glass member.
Figure 17:
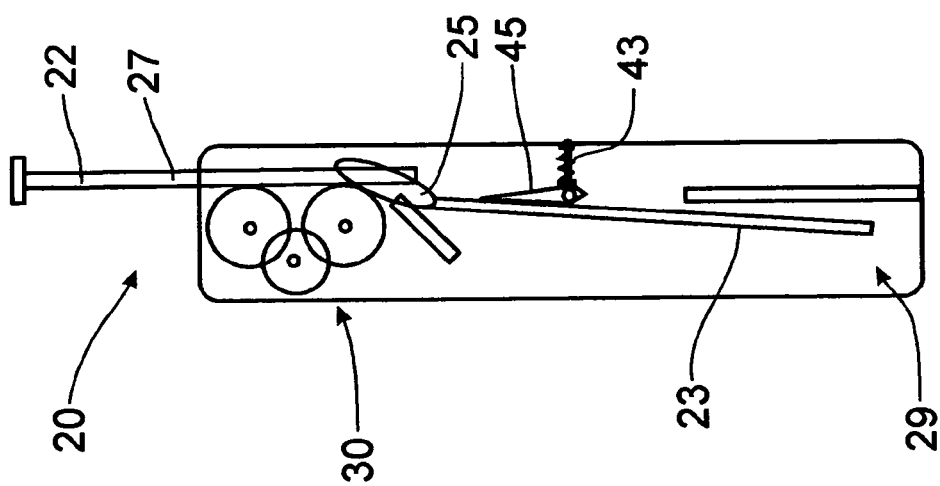
FIG. 17 is a schematic cross-sectional view similar to that of FIG. 16 but with the window further retracted into the storage area to a point where the upper and lower glass members begin to separate and the flipper member engages the lower glass member to position the lower glass member laterally into a corresponding storage pocket.

After the lower glass member 23 has passed out of engagement with the driven pinions 34, the spring member 28 push the lower glass member 23 laterally relative to the upper glass member 22, while remaining connected thereto by the connecting link 25, as is reflected in FIGS. 7 and 17. The connecting link 25 pivots on the lower glass member 23 to accommodate this lateral movement. Meanwhile, the drive mechanism 30 continues to drive the movement of the upper glass member 22 into the storage cavity 11. The connecting link 25 rides in the channel 27 mounted on the ends of the upper glass member 22 and slides along the channel 27 to allow the upper glass member 22 to further descend into the storage cavity 11 in a generally parallel path to the position of the lower glass member 23, though laterally spaced therefrom. The driven pinions 34 continue to lower the upper glass member 22 until hitting a stop that corresponds to the completely lowering of the glass members 22, 23 into the storage cavity 11.

The opposite lateral movement of the lower glass member 23 is depicted in FIGS. 20a–20e. One of ordinary skill in the art will recognize that the spring members 28 would have to be oppositely mounted, as compared to the depiction in FIGS. 4–8 and 15–19, in order to appropriately deflect the movement of the lower glass member 23. The movement of the connecting link 25 is best reflected in FIGS. 20a–20e, as the connecting link slides along the ends of the upper glass member 22.

The return of the glass members 22, 23 from the retracted position is primarily opposite to that described above to lower the split glass configuration. The drive mechanism 30 is actuated to rotate the driven pinions 34 in a manner to lift the rack 35 on the upper glass member 22. The connecting links 25 slide along the channels 27 on the respective ends of the upper glass member 22 until the connecting links 25 bottom out in the channels 27, whereupon the connecting links 25 become raised with the upper glass member 22. The connecting links 25 drag the top portion of the lower glass member 23 upwardly with the upper glass member 22 with the seal 24 re-engaging as the upper and lower glass members 22, 23 align. As the lower glass member 23 ascends with the upper glass member 22, the spring members 28 or 40 direct the lower glass member 23 along a path of travel into vertical alignment with the upper glass member 22 until the spring members 28 or 40 disengage the lower glass member 23 and the upper and lower members 22, 23 are fully raised.

The split glass configuration is also not limited to two transverse members, an upper glass member 22 and a lower glass member 23. Multiple glass panels (not shown) could be formed in the window configuration provided that the deflection apparatus within the storage area would be operable to separately deflect each split glass panel into a separate storage pocket within the storage area into which the window retracts. The connecting links interconnecting adjacent split glass panels would be pivotally connected to the lower panel and slidably connected to the upper panel, as is described above. For example, a three panel split glass configuration would have the center panel associated with two separate sets of connecting links. The lower set of connecting links would be pivoted on the top of the lower panel and slidably received on the center panel, while the upper set of connecting links would be pivoted on the top of the center panel and slidably received on the top panel.

One skilled in the art will recognize that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. For example, a manually operated window drive mechanism would be operable in lieu of the powered drive mechanism 30 described above, though the powered drive mechanism 30 would certainly be preferable.

Having thus described the invention, what is claimed is:

1. A window assembly for an automotive vehicle, said window assembly being vertically movable within an opening in said vehicle to move between an upright closed position and a lowered opened position, said window assembly retracting into a storage area below said opening, said window assembly including a drive mechanism for affecting the movement of the window assembly between said closed and opened positions, comprising:

an upper glass member extending horizontally across an upper portion of said opening when in said closed position;

a lower glass member extending horizontally across a lower portion of said opening when in said closed position;

a seal extending horizontally between said upper and lower glass members;

a pivotal connecting link apparatus interconnecting said upper and lower glass members; and a deflection device positioned within said storage area to deflect said lower glass member out of vertical alignment with said upper glass member as said upper and lower glass members are being lowered from said closed position to said opened position.

2. The window assembly of claim 1 wherein said connecting link apparatus comprises a pair of laterally spaced connecting links positioned at laterally opposed ends of said upper and lower glass members, each said connecting link being pivotally connected to said lower glass member.

3. The window assembly of claim 2 wherein said upper glass member is formed with slides on laterally opposing ends thereof, said connecting links being slidably engaged with said upper glass member through said slides and movable between an upper limit and a lower limit.

4. The window assembly of claim 3 wherein said upper and lower glass members are further formed with a rack affixed to said laterally opposed ends for engagement with said drive mechanism to affect the movement of said upper and lower glass members between said closed and opened positions.

5. The window assembly of claim 3 wherein said deflection device is positioned to engage said lower glass member as said lower glass member descends into said storage area while moving from said closed position toward said opened position, said deflection device being operable to displace said lower glass member out of vertical alignment with said upper glass member when said lower glass member is fully descended into said storage area.

6. The window assembly of claim 5 wherein said deflection device comprises spring members.

7. The window assembly of claim 5 wherein said deflection device comprises flipper members positioned to engage said laterally opposing ends of said lower glass member.

8. The window assembly of claim 5 wherein said storage area has a vertical height less than a corresponding vertical height of said opening.

9. The window assembly of claim 5 wherein said seal is formed as an H-shaped member carried by said lower glass member, said seal defining an upper channel to receive a lower edge of said upper glass member and a lower channel mounted to an upper edge of said lower glass member, said upper channel having a short vertical leg on an inside portion of said seal to facilitate a disengagement of said upper glass member from said seal when said lower glass member is displaced out of vertical alignment with said upper glass member.

10. The window assembly of claim 5 wherein said seal comprises a first seal member affixed to a lower edge of said upper glass member and a second seal member affixed to an upper edge of said lower glass member, said first and second seal members having angled mating engagement surfaces facilitating the disengagement of said upper and lower glass members when said lower glass member is displaced.

11. In an automotive vehicle having a body formed with an opening therein, said body defining a storage area below said opening, an improved window assembly operable within said opening to be vertically positionable between a raised closed position in which said opening is closed and a lowered opened position in which said opening is open, comprising:

an upper glass member having opposing laterally spaced ends and extending horizontally across an upper portion of said opening when in said closed position;

a lower glass member having opposing laterally spaced ends and extending horizontally across a lower portion of said opening when in said closed position;

a pair of connecting links interconnecting said upper and lower glass members, each said connecting link being pivotally connected to an upper portion of a corresponding lateral end of said lower glass member and slidably received on a corresponding lateral end of said upper glass member.

12. The automotive vehicle of claim 11 further comprising a deflection device positioned within said storage area to displace said lower glass member out of vertical alignment with said upper glass member as said lower glass member descends into said storage area as said window assembly is being lowered from said closed position toward said opened position.

13. The automotive vehicle of claim 12 further comprising a seal extending horizontally between said upper and lower glass members, said seal being formed as an H-shaped member carried by said lower glass member, said seal defining an upper channel to receive a lower edge of said upper glass member and a lower channel mounted to an upper edge of said lower glass member, said upper channel having a short vertical leg on an inside portion of said seal to facilitate a disengagement of said upper glass member from said seal when said lower glass member is displaced out of vertical alignment with said upper glass member.

14. The automotive vehicle of claim 12 wherein said storage area has a vertical height less than a corresponding vertical height of said opening.

15. The automotive vehicle of claim 12 wherein said deflection device includes a spring member that subjects said lower glass member to a biasing force urging said lower glass member away from said upper glass member.

16. A method of moving an automotive window from a raised closed position in which said window covers an opening to a lowered opened position in which said window is retracted into a storage area below said opening, comprising the steps of:

actuating a window drive mechanism to cause retraction of said window into said storage area;

engaging a lower portion of said window with a deflecting device mounted within said storage area;

deflecting a lower glass member forming said lower portion of said window out of vertical alignment with an upper glass member forming an upper portion of said window;

sliding connecting links pivotally attached to said lower glass member along corresponding lateral sides of said upper glass member as said upper glass member continues to descend into said storage area; and retracting said upper glass member into said storage area until said upper glass member is positioned generally horizontally beside said lower glass member within said storage area.

17. The method of claim 16 further comprising the step of:

positioning said lower glass member in a storage location before said sliding and retracting steps.

18. The method of claim 17 wherein said deflecting step includes the step of separating a lower edge of said upper glass member from a seal carried by an upper edge of said lower glass member.

19. The method of claim 18 wherein said separating step occurs after said lower glass member is retracted into said storage area below said drive mechanism.

20. The method of claim 19 wherein said retracting step enables said window to be retracted into a storage area having a vertical height less than a corresponding vertical height of said opening.

* * * * *